(12) United States Patent
den Hartog et al.

(10) Patent No.: US 8,503,644 B2
(45) Date of Patent: Aug. 6, 2013

(54) METHOD OF AND A COMMUNICATIONS SYSTEM FOR PLAYING A MESSAGE TO A CALLING PARTY

(75) Inventors: Jos den Hartog, SE Capelle a/d Ijssel (NL); Daniel Johannes Josephus Adriaan Akkermans, Oosterhout (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 615 days.

(21) Appl. No.: 12/159,708

(22) PCT Filed: Dec. 30, 2005

(86) PCT No.: PCT/EP2005/014203
§ 371 (c)(1),
(2), (4) Date: Aug. 2, 2010

(87) PCT Pub. No.: WO2007/076884
PCT Pub. Date: Jul. 12, 2007

(65) Prior Publication Data
US 2010/0226483 A1    Sep. 9, 2010

(51) Int. Cl.
*H04M 3/42*    (2006.01)
(52) U.S. Cl.
USPC ................................ 379/201.01; 455/414.1

(58) Field of Classification Search
USPC ................. 379/88.01–88.23, 211.01, 215.01, 379/142.15; 455/414.1, 419
See application file for complete search history.

(56) References Cited

U.S. PATENT DOCUMENTS

| | | | |
|---|---|---|---|
| 6,724,872 B1 * | 4/2004 | Moore et al. | 379/93.35 |
| 6,795,530 B1 | 9/2004 | Gilbert et al. | |
| 6,950,504 B1 * | 9/2005 | Marx et al. | 379/88.19 |
| 7,269,415 B2 * | 9/2007 | Bostrom et al. | 455/419 |
| 7,746,996 B1 * | 6/2010 | Ruckart | 379/211.01 |
| 2003/0156701 A1 * | 8/2003 | Burg et al. | 379/215.01 |
| 2009/0219927 A1 * | 9/2009 | Hartog et al. | 370/355 |

FOREIGN PATENT DOCUMENTS

| | | |
|---|---|---|
| EP | 1 081 928 A | 3/2001 |
| KR | 2005/0028180 A | 3/2005 |
| WO | WO 2005/057953 A1 | 6/2005 |

* cited by examiner

*Primary Examiner* — Mohammad Islam

(57) ABSTRACT

A method of and a communications system (50) for playing a message to a calling party (1) when the calling party (1) calls a called party (2) and the called party (2) is alerted to the call. The message (30) is also played after the called party (2) disconnects (26) from the call (24). The play of the message may be put on hold when the called party (2) answers the call and the play of the message may be continued (38; 30) when the called party (2) disconnects from the call. The message may be replayed when the called party (2) disconnects from the call (24). During play of the message (30) the calling party (1) may be provided connect control (47) of the play.

27 Claims, 7 Drawing Sheets

METHOD OF AND A COMMUNICATIONS SYSTEM FOR PLAYING A MESSAGE TO A CALLING PARTY

FIELD OF THE INVENTION

The present invention relates to communications systems and, more particularly, to fixed and mobile telephone systems for playing a message to a calling party.

BACKGROUND OF THE INVENTION

In fixed and/or cellular radio telecommunications systems, such as the Public Switched Telephone Network (PSTN) or the Global System for Mobile communications (GSM), for example, a so-called Personalized Greeting Service (PGS) may be applied. If a first user or called party has a subscription to PGS, a second user or calling party when calling the first user, receives a message instead of a ringback tone. While the called party is alerted to the call, the message is played to the calling party.

The message may comprise a spoken message, an audio message such as a music clip or song, a video clip, a picture or the like.

With the existing PGS, the message to the calling party is terminated once the called party answers the call. However, it may be the case that the calling party has not completely received the message or would like to hear or see the message again. In such a case, after the call has been terminated, the calling party has to set up another call to the called party for receiving the message again.

SUMMARY OF THE INVENTION

It is a first object of the present invention to improve the PGS such that a calling party is provided an opportunity to receive the message completely.

It is a further object of the present invention to improve the PGS to provide a calling party control over a message played to the calling party.

These and other objects of the present invention are achieved by a method of playing, in a communications system, a message to a calling party, wherein the message is played while a called party is being alerted of a call. According to the invention the message is also played to the calling party after the called party has disconnected from the call.

With the method of the present invention, the message is not only played during the time that the called party is alerted, but also after the called party has disconnected from or terminated the call, for example by hanging up. Note that the calling party remains connected to the call.

Accordingly, for listening to the complete message, the calling party does not need to set up a new call to the called party with the risk that the called party answers the call before the message is completed. With the improved method according to the present invention, the calling party is provided an opportunity to retrieve the entire message without interruption by the called party.

In an embodiment of the method according to the invention, the play of the message is put on hold when the called party answers the call and the play of the message is continued when the called party disconnects from the call.

In a further embodiment of the method according to the invention, the message is replayed when the called party disconnects from the call.

In a preferred embodiment of the method according to the invention, during the play of the message, the calling party is provided control of the play. Such a control may comprise, in accordance with the invention, at least one of play forward, play back, pause, repeat and stop of the play.

With this control, the calling party is able to skip parts of a message or to listen back to earlier parts of a message or to stop a play. The control feature provides further the opportunity to play a so-called interactive message, which may require some input from the calling party to listen to the message, whether or not prompted to by the message. Further, to make notes of the content of the message, for example, it may be helpful to pause the message or to play fast forward or play fast back.

It will be appreciated that with such a control over the play, enhanced opportunities are provided to personalize the message by the called party, using the interaction possibility provided to the calling party.

For controlling the play by the calling party, in a further embodiment of the method according to the invention, the calling party is presented a menu. This menu may be orally presented to the calling party through the communications terminal used by the calling party for calling the called party. If available on such a communications terminal, the menu may be provided, in accordance with a still further embodiment of the method according to the invention, on a display of the communications terminal.

Control over the play may be provided, for example, using voice command and voice recognition or by enabling a keypad or a touch screen of a communications terminal used by the calling party for calling the called party.

In a further preferred embodiment of the method according to the present invention, the play of a message is automatically stopped, once a predetermined condition has been met. Such as, but not limited to, when the message is played a number of times in its entirety to the calling party, wherein this number is equal to or greater than one, or after a set time period has been lapsed. This, to avoid that a message is repeatedly played to a calling party who has forgotten to disconnect from the call, for example. In a further embodiment of the invention, stopping of the play of the message includes termination of the call.

The type of messages provided to the calling party is not limited to a particular type of content. In accordance with the present invention, the message may be any of a group comprising a spoken message, an audio message, a graphical message, a picture message, a video message and a data message, either alone or in combination. The type of message played may depend on the type of communications terminal used by the calling party for calling the called party.

The invention further provides a communications system arranged for placing calls from a calling party to a called party, the system comprises playing means for playing a message to a calling party while a called party is being alerted of a call, and wherein the playing means are arranged for playing the message to the calling party after the called party has disconnected from the call.

In a further embodiment of the communications system according to the invention, the playing means are arranged for putting the message on hold when the called party answers the call and wherein the playing means are arranged for continuing the play of the message when the called party has disconnected from the call.

In a still further embodiment of the communications system according to the invention, the playing means are arranged for replaying the message when the called party has disconnected from the called.

For providing control of the playing means, in another embodiment of the communications system according to the invention, the playing means comprise control means for controlling the playing means during the play of the message.

The control means, in accordance with the invention, may comprise at least one of play forward, play back, pause, repeat and stop of the playing means, i.e. the play of the message.

In the case of a telephone system, for example, it is advantageous to present control over the playing means to the calling party by a menu. In accordance with the invention, the control means can be arranged for presenting such a menu audibly to the calling party and/or by using a display on a communications terminal used by the calling party for calling the called party.

Using a display provides the opportunity to play video and/or graphic messages by the playing means.

The control means are arranged, in a further embodiment of the communications system according to the invention, for enabling control of the playing means using a keypad and/or a touch screen of a communications terminal and/or by voice or speak recognition means, to accept to spoken commands, from the calling party.

The communications system, in a preferred embodiment of the invention, is further arranged for providing to the called party access to the playing means, for personalizing the message. Personalizing a message is to be construed as storing a particular message in the playing means by the called party. With the availability of control over the play of the message by the calling party, such a personalised message may comprise interactive content requiring some type of interaction by the calling party, using the control means.

In an embodiment of the communications system according to the invention, the communications system and the playing means are arranged to stop the play of a message automatically, once a predetermined condition has been met. Such as, but not limited to, when the message is played a number of times in its entirety to the calling party, wherein this number is equal to or greater than one, or after a set time period has been lapsed. In a further embodiment of the invention, stopping of the play of the message automatically includes termination of the call. In an embodiment of the communications system according to the invention, the communications system and the playing means are arranged to stop the play of a message automatically, once a predetermined condition has been met. Such as, but not limited to, when the message is played a number of times in its entirety to the calling party, wherein this number is equal to or greater than one, or after a set time period has been lapsed. This, to avoid that a message is repeatedly played to a calling party who has forgotten to disconnect from the call, for example. In a further embodiment of the invention, stopping of the play of the message includes termination of the call.

The invention further provides playing means arranged for use with a communications system and control means arranged for use with playing means in a communications system as disclosed above.

The above-mentioned and other features and advantages of the invention will be best understood from the following description, with reference to the enclosed drawings.

In the drawings, like reference numerals denote identical parts or parts performing an identical or comparable function or operation.

DETAILED DESCRIPTION OF PREFERRED EMBODIMENTS

Figure 1:
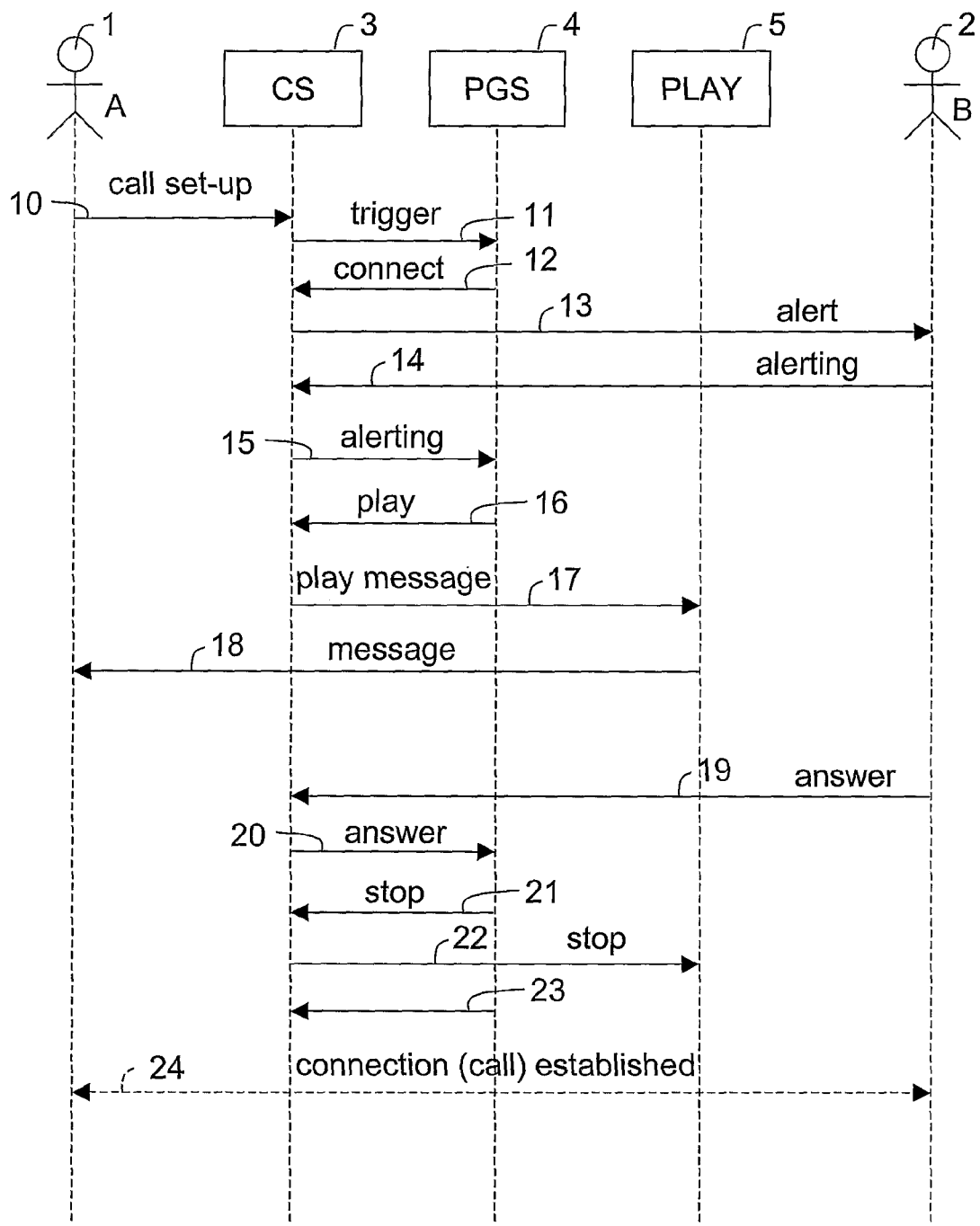
FIG. 1 shows a simplified flow chart for activating the prior art PGS-service in a communications system.

FIG. 1 shows a simplified flowchart of a prior art Personalized Greeting Service (PGS) in a communications system, such as a telephone communications network.

Reference numeral 1 denotes a first user A or calling party and reference numeral 2 denotes a second user B or called party. The communications system (CS), either a fixed or wired system, such as the Public Switched Telephone Network (PSTN) or the Integrated Service Digital Network (ISDN), or a wireless communications system, such as, for example, the cellular Global System for Mobile communications (GSM), is generally indicated by reference numeral 3. For clarity purposes, the PGS, as in operation in the communications system 3, is separately indicated and denoted with reference numeral 4. Those skilled in the art will appreciate that the PGS 4 may form an integral part of the software for controlling the communications system 3. Reference numeral 5 denotes playing means, for playing a message associated with the PGS 4. In this type of flow charts, the time line runs from the top to the bottom of the figure, and is not shown for convenience sake.

When the calling party 1 wishes to communicate with another party in the communications system 3, the first step is initiating 10 a call, i.e. a call set-up, by the calling party 1 to a called party 2. The communications system 3, receiving the request for setting up a call to the called party 2, provides a trigger 11 to the PGS 4, assuming that the called party 2 has availed himself/herself with this service. The PGS 4 triggers 12 the set-up of the connection to the called party 2 via the communications system 3, i.e. the Core Network thereof, while the called party 2 is alerted 13 by the communications system 3.

Once it has been established that a telecommunications terminal, for example a telephone, of the called party 2 is alerting 14, the communications system 3 informs 15 the PGS 4 accordingly. In response to this information, the PGS 4 activates 16 the playing means 5, via the communications system 3, to start playing 17 a message to the calling party 1, indicated by arrow 18 in FIG. 1. The message is played over a communications path of the communications system 3 to a communications terminal that the calling party 1 uses for setting up the call, till the called party 2 answers 19 the call request, by accepting the call. This leads to an answer message 20 of the communications system 3 to the PGS 4 and a stop message 21 from the PGS 4 to the communications system 3 to stop 22 the playing means 5. This will terminates the transfer of the message 18 to the calling party 1.

With a connect message 23, the PGS triggers the connection of the calling party 1 and the called party 2 by the communications system 3, resulting therein that the requested call or connection is established, indicated by a double dashed arrow 24. The call now progresses as usual, i.e. when either of the parties 1 or 2 disconnects, the call will be terminated by the communications system 3.

As can be clearly seen from the prior art FIG. 1, the message 18 is only played to the calling party 1, while the called party is being alerted 13, i.e. while the called party 2 has not answered the call.

Figure 2A:
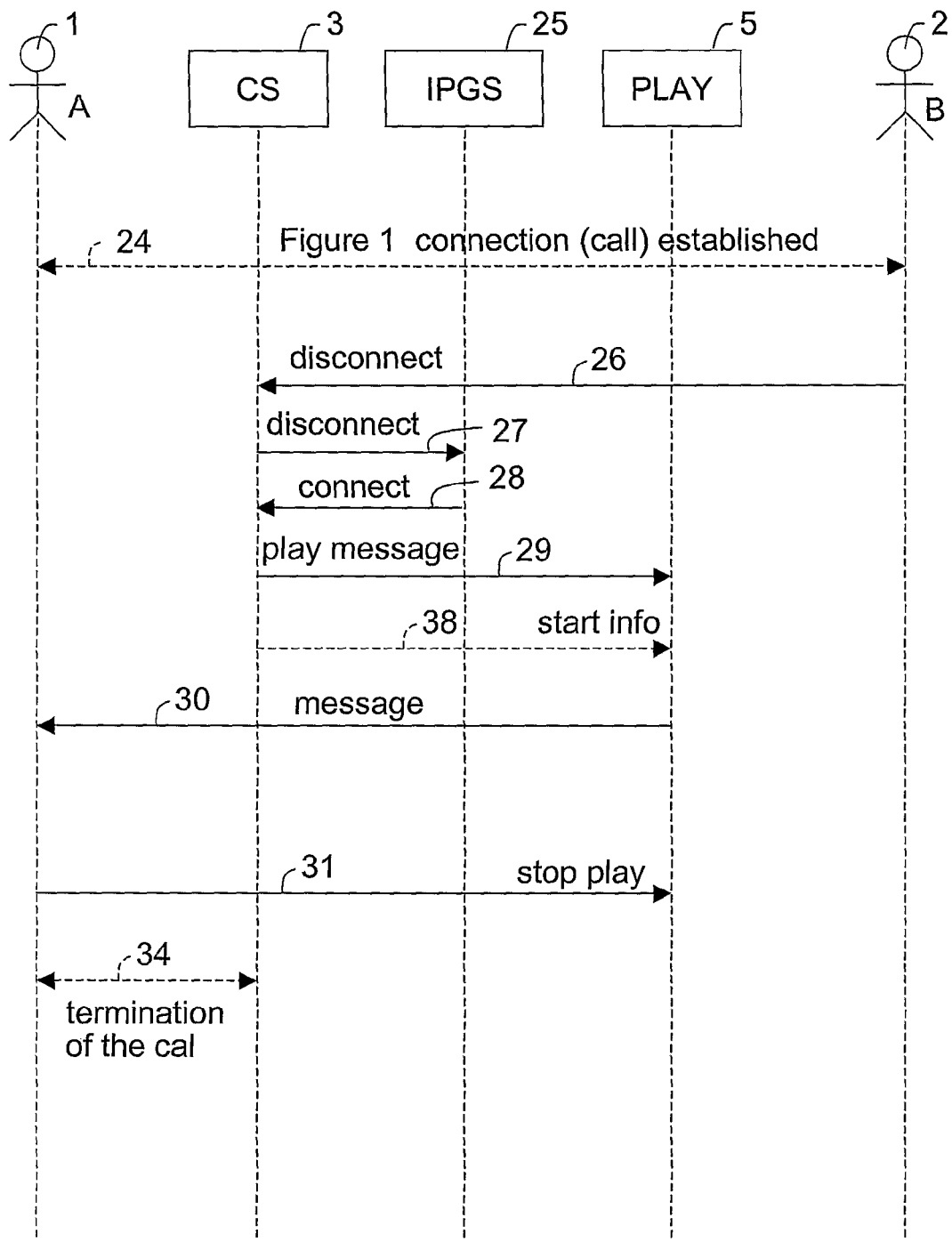
FIGS. 2a, 2b, 2c and 2d show simplified flow charts of embodiments of the method according to the present invention.

FIG. 2a shows a flowchart of the method according to the invention. In conformity with the prior art PGS 4, reference numeral 25 denotes an improved messaging service, IGPS, in accordance with the present invention, in an embodiment thereof.

The messaging service 25 operates in conformity with the prior art PGS 4 disclosed in FIG. 1, when the calling party 1 calls the called party 2, who has availed himself/herself of the messaging service 25. In FIG. 2, this is generally indicated by the double dashed arrow 24, representing the steps 10-23 inclusive the set up of the call.

In accordance with the present invention, when the called party 2 disconnects 26 from the call, for example by "hanging up", which is detected by the communications system 3, a disconnect message 27 is provided from the communications system 3 to the messaging service 25 indicating that the called party 2 has disconnected from the call. In response thereto, the messaging service 25 informs 28 the communications system 3 to keep the connection with the calling party 1 alive and to start 29 the playing means 5 for playing 30 a message to the calling party 1.

Accordingly, a message is not only played while the called party 2 is alerted of a call from the calling party 1, but also when the called party 2 has disconnected from the call. Generally, the message 30 will be the same as message 18 played to the calling party 1 at call set up, however the message 30 may partly or completely differ from the message 18. However, in the remainder of this description, it is assumed that the message 30 will be the same as message 18 (see FIG. 1).

The message 30 may be played from the beginning thereof, i.e. replayed, or the message 30 may continue from the point at which the message 18 stopped because the called party 2 answered the call. The message 30 will be played, and if applicable repeated, as long as the calling party 1 connects to the call.

In the embodiment shown in FIG. 2a, a message 31 may be provided by the calling party 1 to stop the playing means 5. This stop message may be generated automatically when the calling party 1 terminates the call by disconnecting therefrom, e.g. by "hanging up". The call may be automatically terminated in a manner known to those skilled in the art, which does not need to be further elucidated here. Termination of the call is schematically indicated by reference numeral 34.

Figure 2B:
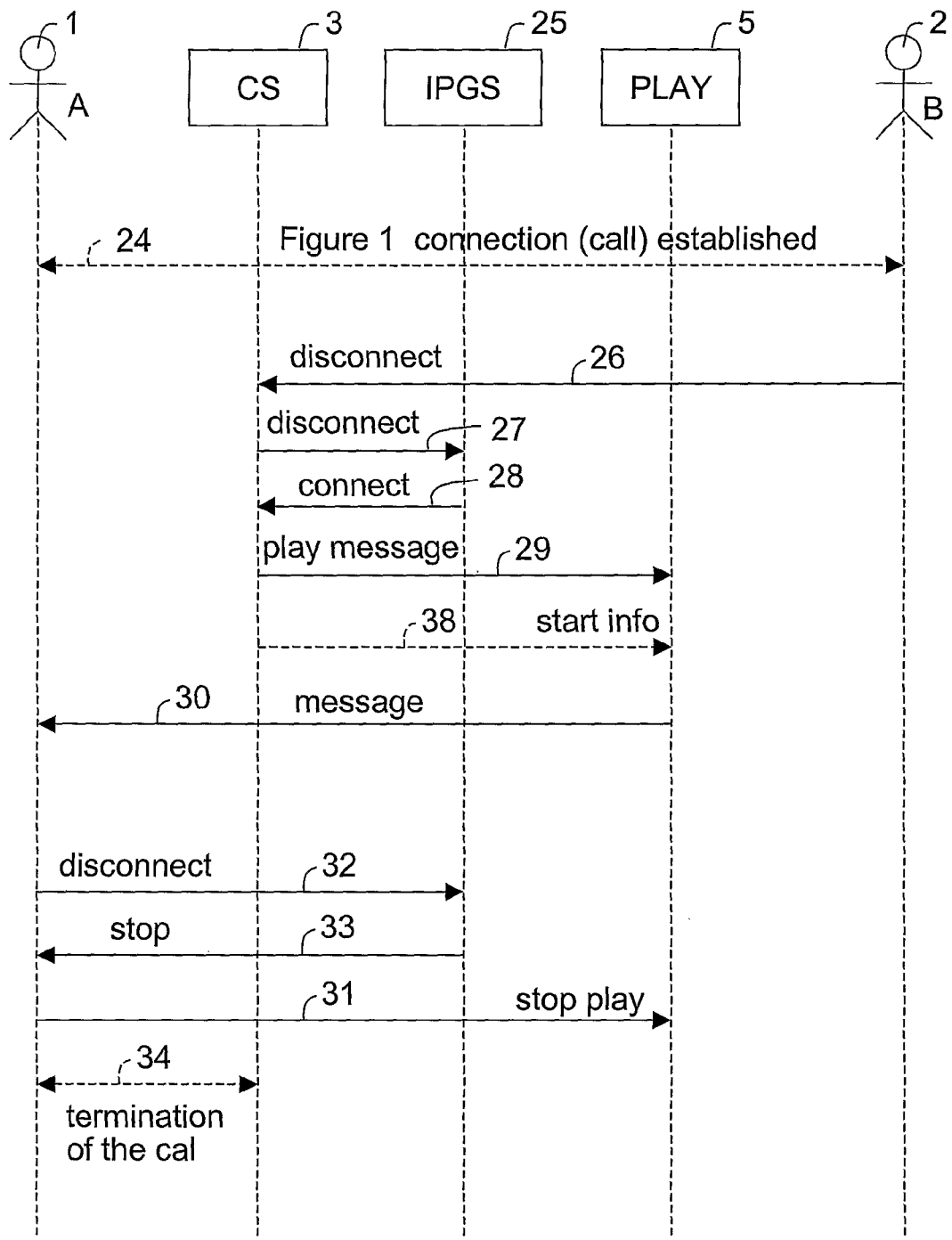

In the embodiment of the present invention shown in FIG. 2b, the playing means 5 are stopped through the improved messaging service 25. A disconnect message 32 is be provided by the calling party 1 to the IGPS 25, which returns a stop message 33 to the calling party 1, i.e. the telecommunications terminal by which the calling party 1 has established the call to the called party 2, eventually resulting in a stop message 31 to the playing means 5, as disclosed above in connection with FIG. 2a.

While the replay of a message may continue as long as the calling party 1 does not terminate the call, in another embodiment of the invention, the playing means 5 are automatically stopped once a predetermined condition has been met, such as when the message has been played ones in its entirety or after a number of times the message has been repeated or after a set time interval, for example. This, either controlled directly by the playing means 5, step 35 in FIG. 2c, or controlled by the messaging service 25, i.e. via the communications system 3, i.e. steps 36, 37 in FIG. 2d.

As disclosed above, the messaging service 25 may be arranged, in accordance with the present invention, for continuing play thereof from the point at which the message was stopped by answering of the call by the called party 2. This requires storing of information on what part of a message has been played already to the calling party 1 at the point in time at which the answer message 20 (see FIG. 1) of the communications system 3 arrives at the messaging service 25, indicating that the called party 2 has answered the call request. The playing means 5 will be put on hold and step 28 will invoke a start message 38, indicated by a dashed arrow, comprising information as from which part of the message the playing means 5 have to resume their play to the calling party 1.

Figure 3:
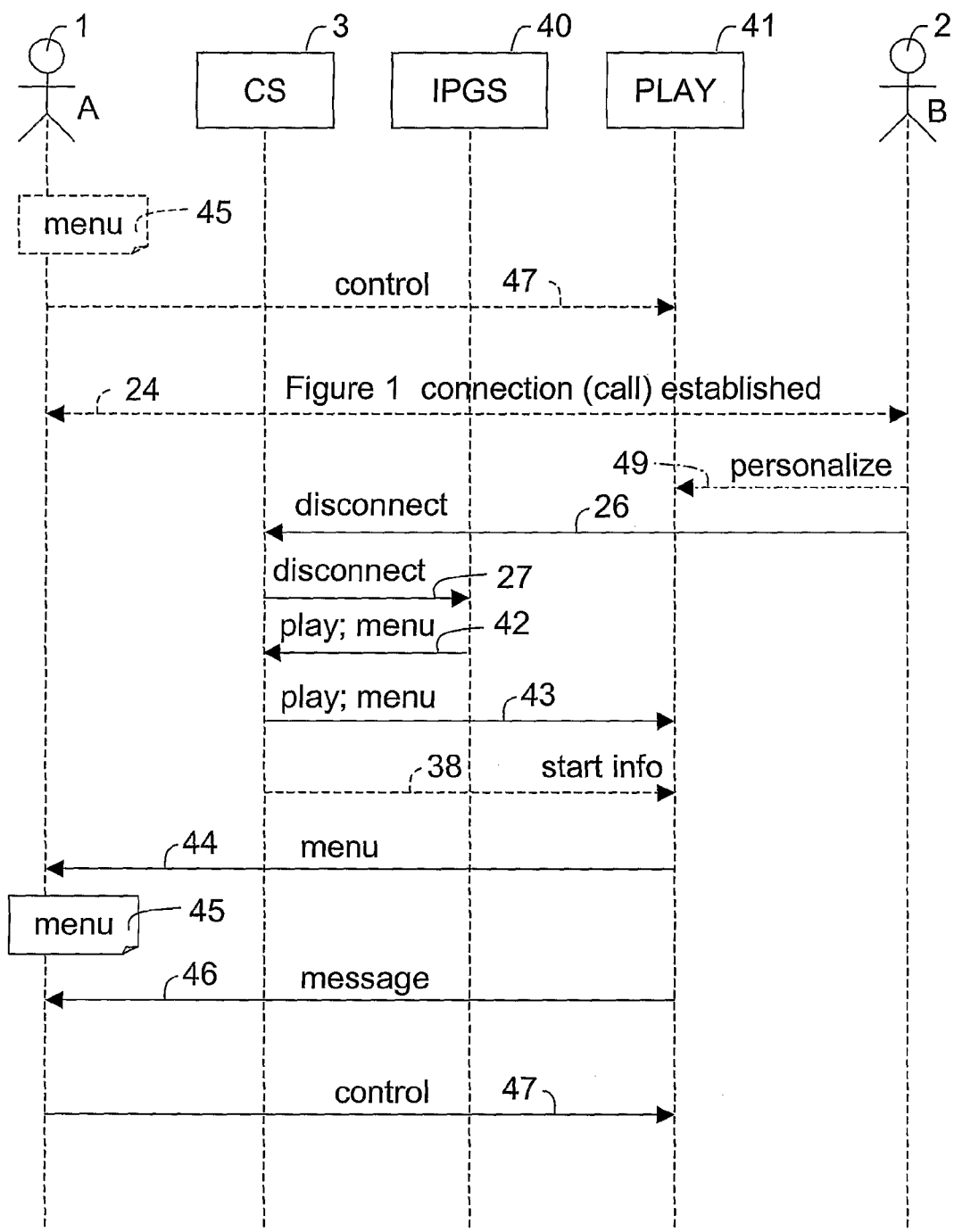
FIG. 3 shows a simplified flow chart of the method according to present invention in another embodiment thereof.

FIG. 3 shows another embodiment of the method according to the invention, comprising a messaging service 40. The messaging service 40 essentially operates for playing a message to a calling party 1 during call set up, i.e. while alerting the called party 2, and after the called party 2 has disconnected from the call as disclosed above with reference to the messaging service 25, as such indicated by a dashed arrow having reference numeral 24. Like the messaging service 25, the messaging service 40 may be comprised in the communications network control software, for example.

In addition to the messaging service 25, the messaging service 40 provides control 47 to the calling party 1 over playing means 41, such as to play (fast) forward, play (fast) back, pause, repeat and stop of the playing means 41.

To this end, in the embodiment shown, next to the play of the message, a menu 45 is played 44 by the playing means 41 to the calling party 1 as selected by the messaging service 40, i.e. steps 42, 43. The message to be played to the calling party 1, either in response to the control 47, is indicated by arrow 46. The menu 45 may be provided in audible form and/or via a display available on a telecommunications terminal used by the calling party 1 for setting up the call. It will be appreciated that the menu 45, in accordance with the present invention, may also be provided to the calling party 1 when calling the called party 2, i.e. when the called party 2 is alerted of a call. In FIG. 3 this is schematically indicated by dashed lines at the top of the flow.

Control 47 of the message may be invoked, for example, orally or via keypad means available on a telecommunications terminal used by the calling party 1 for setting up the call.

The message to be played may be a spoken message, an audio message, a graphical message, a video message, a picture message and a data message, either alone or in combination. The type of message played may depend on the type of communications terminal used by the calling party for calling the called party. The message may be personalized, for example, by the called party 2, for example as an interactive message, requiring control input from the calling party 1, as schematically indicated by a dashed dotted arrow 49 in FIG. 3.

Figure 4:
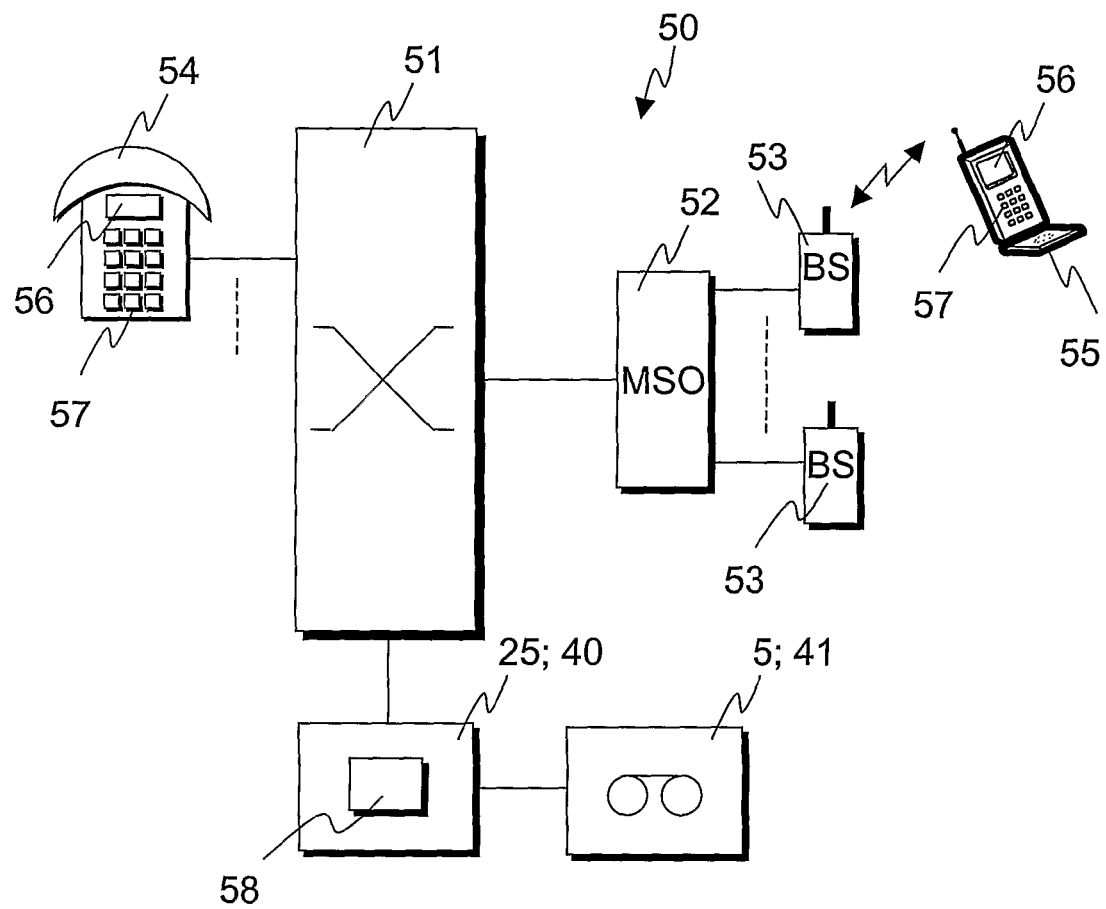
FIG. 4 shows, in a schematic and illustrative manner, a communications system arranged for operating in accordance with the present invention.
Figure 2A:
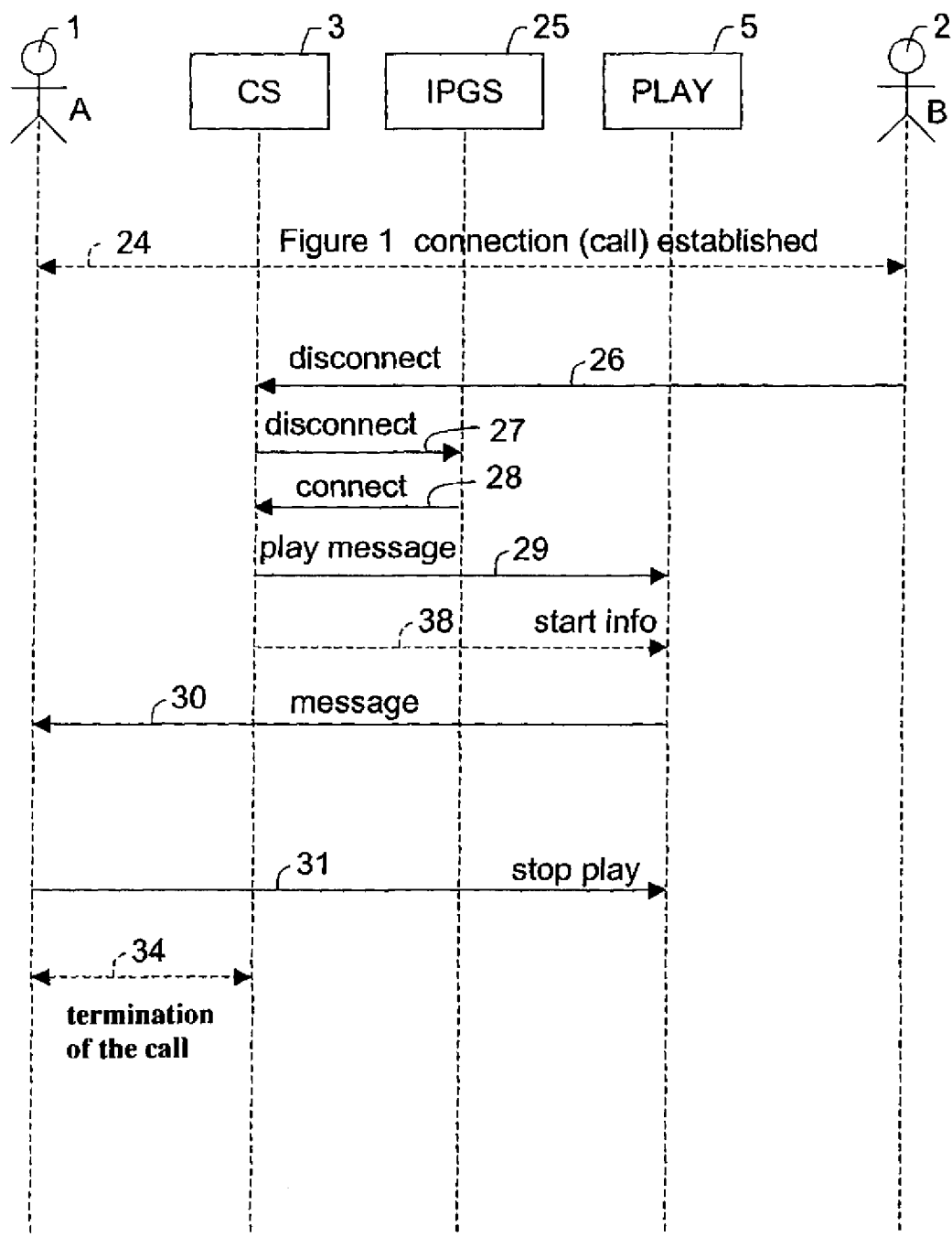

FIG. 4 shows, in a very schematic embodiment, a communications system 50 according to the present invention. For illustration purposes, the network 50 comprises both a fixed part 51 and a wireless part 52.

The fixed or wired part 51 may comprise a PSTN and/or an ISDN, preferably an Intelligent Network (IN) configuration, as are well known to those skilled in the art. The wireless part 52 comprises, for example a Mobile Switching Office (MSO), coupled to the fixed part 51, controlling several radio access units or radio Base Stations (BS) 53 such as operating under the GSM or other suitable wireless communication protocol.

Many users or subscribers communicate with a wired communications terminal 54 via the fixed part 51 and many users or subscribers communicate with a mobile communications terminal 55 via the mobile part 52 of the communications network 50.

Most of the communications terminals 54, 55 today comprise display means 56 and keypad means 57, and may be standard telecommunications terminals known in practice, such as standard telephone terminals.

The communications network 50 further comprises playing means 5, 41 and messaging means 25, 40 as disclosed above. Although shown as separate components in FIG. 4, the playing means 5, 41 and the messaging means 25, 40 may be integral to any or both of the fixed part 51 and the wireless part 52 of the communications network. Either alone or in combination implemented in software and/or in hardware form.

In accordance with the present invention, the communications network 50 and the playing means 5, 41 and messaging means 25, 40 are arranged for performing the method of the invention as disclosed above and may include suitable means 58 for stopping the playing means and/or terminating a call after a set condition has been met, as disclosed above.

The present invention is not limited to the embodiments disclosed above. Those skilled in the art may modify and implement the invention, however without having to apply inventive skills.

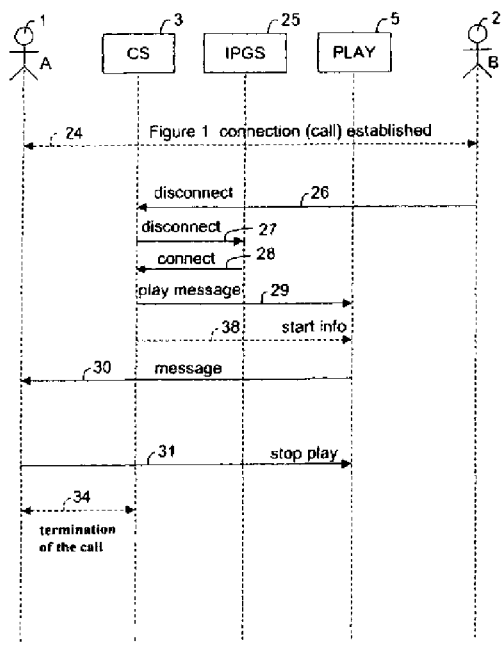

The invention claimed is:

1. A method of playing, in a communications system, a message to a calling party, comprising the steps of:
   begin playing said message to said calling party while a called party is being alerted of a call,
   stopping said playing of said message to said calling party when said called party answers said call, and
   for each call, in response to said called party disconnecting from said call, playing of said message to said calling party.

2. The method according to claim 1, wherein said playing said message to said calling party having been started while said called party is being alerted of said call is put on hold when said called party answers said call, and said play of said message to said calling party having been put on hold is continued when said called party disconnects from said call.

3. The method according to claim 1, wherein said message having been started while said called party was being alerted of said call, is replayed when said called party disconnects from said call.

4. The method according to claim 1, wherein during play of said message said calling party is provided control of playing said message.

5. The method according to claim 4, wherein said control comprises at least one of play forward, play back, pause, repeat and stop of playing said message.

6. The method according to claim 4, wherein said calling party is presented a menu for controlling the playing of said message.

7. The method according to claim 6, wherein said menu is audibly presented to said calling party.

8. The method according to claim 6, wherein said menu is presented on a display of a communications terminal used by said calling party for calling said called party.

9. The method according to claim 4, wherein for control of said play a keypad is enabled of a communications terminal used by said calling party for calling said called party.

10. The method according to claim 1, wherein said message is personalized by said called party.

11. The method according to claim 1, wherein said message is at least one of a group comprising a spoken message, an audio message, a graphical message, a picture message, a video message and a data message.

12. The method according to claim 1, wherein the playing of said message is stopped once a predetermined condition has been met.

13. The method according to claim 12, wherein said playing of said message is stopped when said message is played a number of times in its entirety to said calling party, wherein said number is equal to or greater than one.

14. The method according to claim 12, wherein said playing of said message is stopped after a set time period has lapsed.

15. The method according to claim 12, wherein stopping of said playing of said message includes termination of said call.

16. A communications system arranged or placing calls from a calling party to a called party, said system comprising:
   playing means for playing a message to a calling party while a called party is being alerted of a call, and for stopping said play of said message to said calling party when said called party answers said call, and
   for each call said playing means are arranged to play said message to said calling party, in response to said called party disconnecting from said call.

17. The communications system according to claim 16, wherein said playing means are arranged for putting on hold said playing said message to said calling party when said called party answers said call, said playing means are arranged for continuing playing said message when said called party has disconnected from said call.

18. The communications system according to claim 16, wherein said playing means are arranged for replaying said message when said called party has disconnected from said call.

19. The communications system according to claim 16, wherein said playing means comprise control means arranged for providing control to said calling party of said playing means during the playing of said message.

20. The communications system according to claim 19, wherein said control means are arranged for at least one of play forward, play back, pause, repeat and stop of said playing means.

21. The communications system according to claim 19, wherein said control means are arranged for providing to said calling party a menu for controlling said playing means.

22. The communications system according to claim 21, wherein said control means are arranged for presenting said menu audibly to said calling party 23. The communications system according to claim 21, wherein said menu is presented by said control means on a display of a communications terminal used by said calling party for calling said called party.

24. The communications system according to claim 19, wherein said control means are arranged for enabling control of said playing means from a keypad of a communications terminal used by said calling party for calling said called party.

25. The communications system according to claim 16, wherein said playing means are arranged for personalizing said message by said called party.

26. The communications system according to claim 16, wherein said playing means are arranged for storing and playing a message of at least one of a group comprising a spoken message, an audio message, a graphical message, a picture message, a video message and a data message.

27. The communications system according to claim 6, wherein said playing means are arranged to stop play of a message once a predetermined condition has been met in playing said message.

\* \* \* \* \*

UNITED STATES PATENT AND TRADEMARK OFFICE
CERTIFICATE OF CORRECTION

PATENT NO. : 8,503,644 B2  
APPLICATION NO. : 12/159708  
DATED : August 6, 2013  
INVENTOR(S) : den Hartog et al.

Page 1 of 3

It is certified that error appears in the above-identified patent and that said Letters Patent is hereby corrected as shown below:

Delete Title Page and substitute the attached Title Page therefor.

On the Title Page, in the Figure, for Tag "34", Line 2, delete "cal" and insert -- call --, therefor.

In the Drawings

Delete drawing sheet 2 and substitute the attached drawing sheet 2 therefor.

In Fig. 2a, Sheet 2 of 7, for Tag "34", Line 2, delete "cal" and insert -- call --, therefor.

In Fig. 2b, Sheet 3 of 7, for Tag "34", Line 2, delete "cal" and insert -- call --, therefor.

Figure 2C:
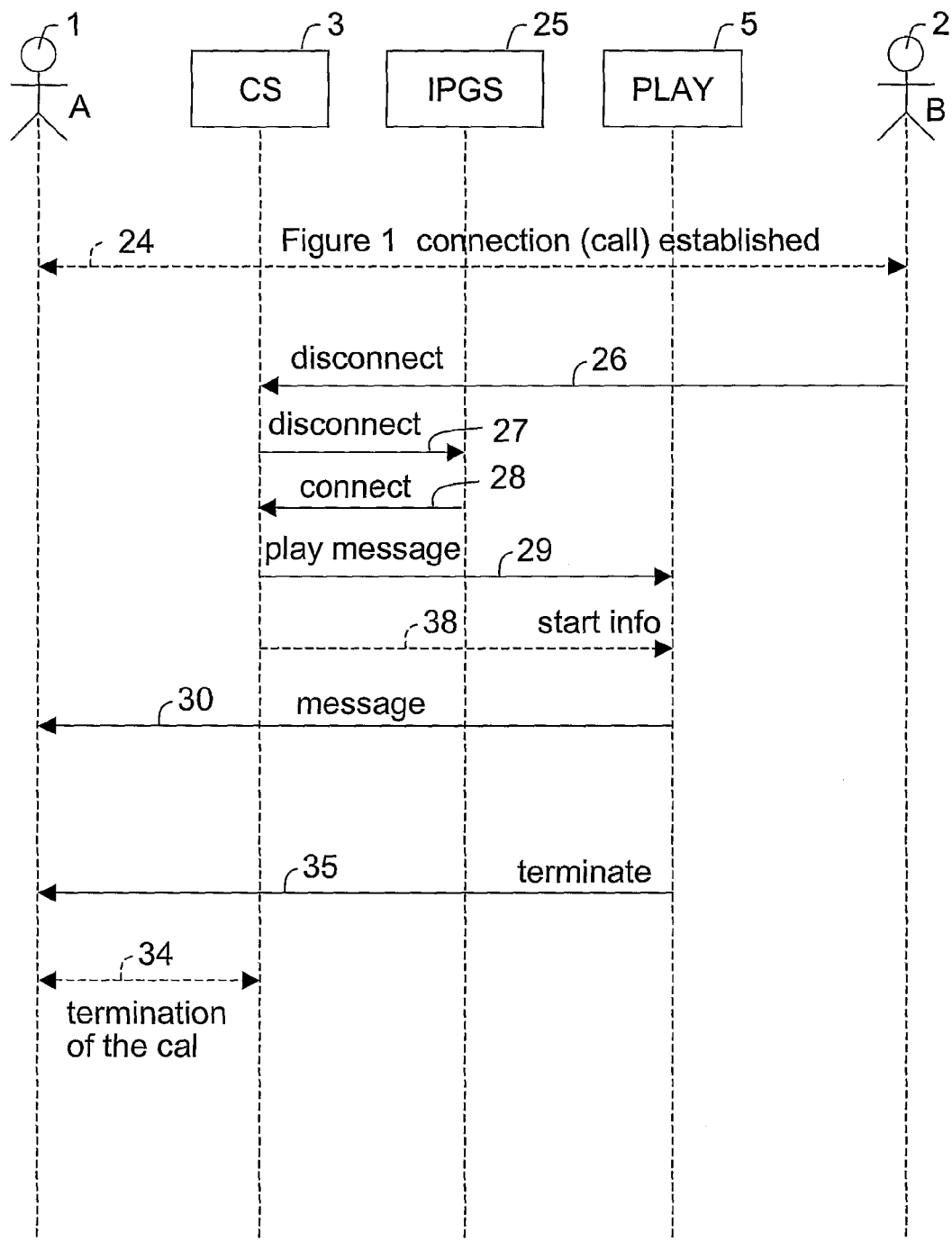

In Fig. 2c, Sheet 4 of 7, for Tag "34", Line 2, delete "cal" and insert -- call --, therefor.

Figure 2D:
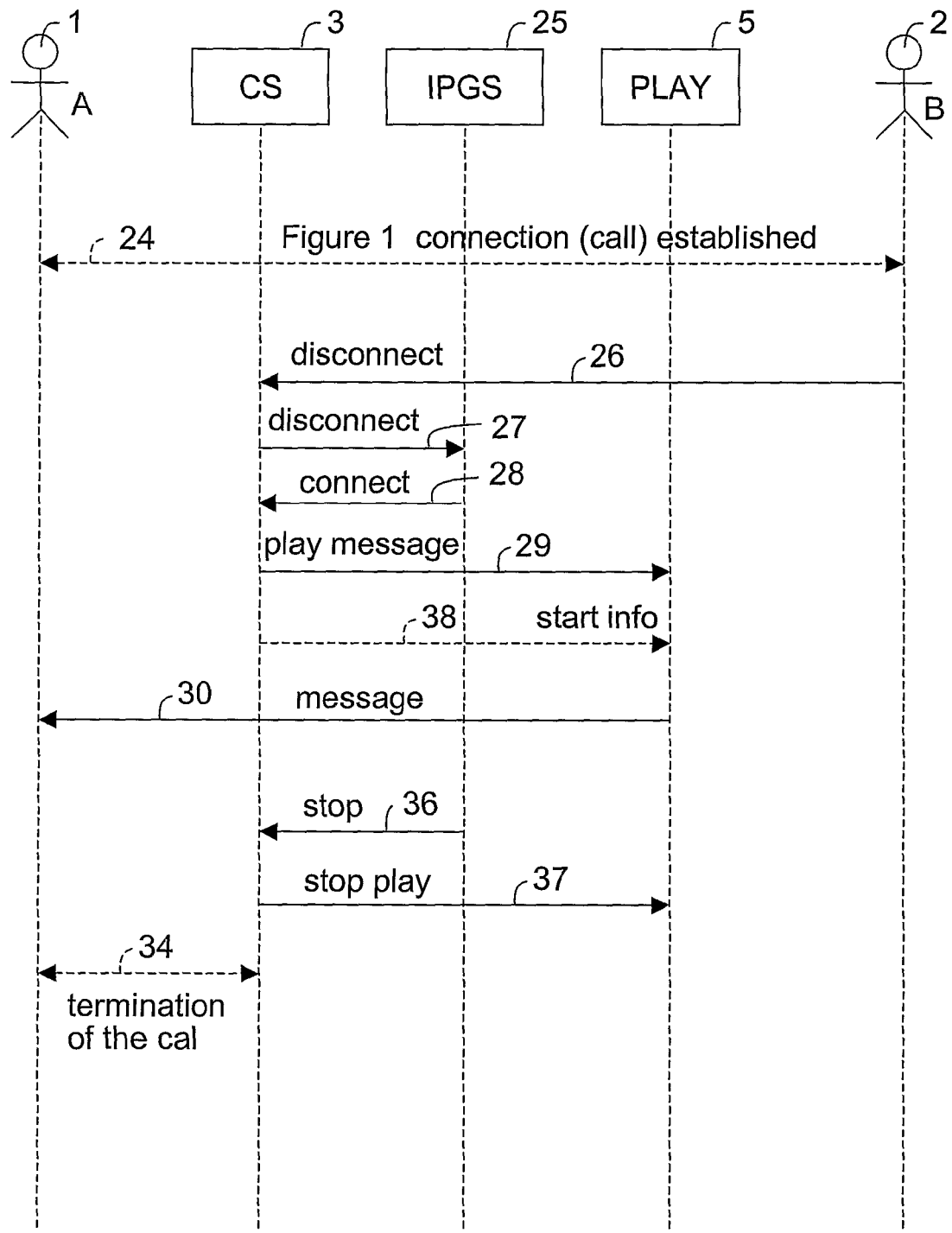

In Fig. 2d, Sheet 5 of 7, for Tag "34", Line 2, delete "cal" and insert -- call --, therefor.

In the Specification

In Column 5, Line 7, delete "IGPS," and insert -- IPGS, --, therefor.

In Column 5, Line 52, delete "IGPS" and insert -- IPGS --, therefor.

In the Claims

In Column 8, Line 16, in Claim 15, delete "or" and insert -- for --, therefor.

In Column 8, Line 49, in Claim 22, delete "party" and insert -- party. --, therefor.

In Column 9, Line 1, in Claim 27, delete "claim 6," and insert -- claim 16, --, therefor.

Signed and Sealed this  
Thirty-first Day of December, 2013

Margaret A. Focarino  
*Commissioner for Patents of the United States Patent and Trademark Office*

(12) United States Patent
den Hartog et al.

(10) Patent No.: US 8,503,644 B2
(45) Date of Patent: Aug. 6, 2013

(54) METHOD OF AND A COMMUNICATIONS SYSTEM FOR PLAYING A MESSAGE TO A CALLING PARTY

(75) Inventors: Jos den Hartog, SE Capelle a/d Ijssel (NL); Daniel Johannes Josephus Adriaan Akkermans, Oosterhout (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 615 days.

(21) Appl. No.: 12/159,708

(22) PCT Filed: Dec. 30, 2005

(86) PCT No.: PCT/EP2005/014203
§ 371 (c)(1),
(2), (4) Date: Aug. 2, 2010

(87) PCT Pub. No.: WO2007/076884
PCT Pub. Date: Jul. 12, 2007

(65) Prior Publication Data
US 2010/0226483 A1  Sep. 9, 2010

(51) Int. Cl.
*H04M 3/42* (2006.01)
(52) U.S. Cl.
USPC .................... 379/201.01; 455/414.1

(58) Field of Classification Search
USPC ........... 379/88.01–88.23, 211.01, 215.01, 379/142.15; 455/414.1, 419
See application file for complete search history.

(56) References Cited

U.S. PATENT DOCUMENTS

| | | | |
|---|---|---|---|
| 6,724,872 B1 * | 4/2004 | Moore et al. | 379/93.35 |
| 6,795,530 B1 | 9/2004 | Gilbert et al. | |
| 6,950,504 B1 * | 9/2005 | Marx et al. | 379/88.19 |
| 7,269,415 B2 * | 9/2007 | Bostrom et al. | 455/419 |
| 7,746,996 B1 * | 6/2010 | Ruckart | 379/211.01 |
| 2003/0156701 A1 * | 8/2003 | Burg et al. | 379/215.01 |
| 2009/0219927 A1 * | 9/2009 | Hartog et al. | 370/355 |

FOREIGN PATENT DOCUMENTS

| | | |
|---|---|---|
| EP | 1 081 928 A | 3/2001 |
| KR | 2005/0028180 A | 3/2005 |
| WO | WO 2005/057953 A1 | 6/2005 |

* cited by examiner

*Primary Examiner* — Mohammad Islam

(57) ABSTRACT

A method of and a communications system (50) for playing a message to a calling party (1) when the calling party (1) calls a called party (2) and the called party (2) is alerted to the call. The message (30) is also played after the called party (2) disconnects (26) from the call (24). The play of the message may be put on hold when the called party (2) answers the call and the play of the message may be continued (38; 30) when the called party (2) disconnects from the call. The message may be replayed when the called party (2) disconnects from the call (24). During play of the message (30) the calling party (1) may be provided connect control (47) of the play.

27 Claims, 7 Drawing Sheets